Sept. 12, 1967  L. R. EDMINSTER  3,340,783

COMPACTOR LUG HAVING REPLACEABLE CAP

Filed July 12, 1965

LESTER R. EDMINSTER
INVENTOR

BY
BUCKHORN, BLORE, KLARQUIST & SPARKMAN
ATTORNEYS

United States Patent Office 3,340,783
Patented Sept. 12, 1967

3,340,783
COMPACTOR LUG HAVING REPLACEABLE CAP
Lester R. Edminster, Portland, Oreg., assignor to West Coast Alloys Co., Troutdale, Oreg., a corporation of Oregon
Filed July 12, 1965, Ser. No. 471,292
8 Claims. (Cl. 94—50)

The subject matter of the present invention relates generally to material compacting apparatus and in particular to a "sheep foot" type compactor roller having a plurality of spaced lugs which are provided with separate removable caps mechanically attached thereto by dovetail joints to enable quick replacement of such caps when they become worn or damaged.

Briefly, one embodiment of the improved compactor lug of the present invention includes a tapered lug body member having a ground-engaging cap member attached thereto by a flat, tapered dovetail joint which extends in the direction of rotation of the compactor roller. The cap member may be formed in two separate segments having tapered dovetail joint portions to enable such segments to be fastened to the top of the lug body member so that such segments fit together to form a continuous ground-engaging surface having a substantially uniform radius of curvature. In addition, each lug may be provided with two pins through the cap segments and lug body for preventing the cap segments from sliding in the direction of the dovetail joint.

Previously it has been proposed to attach a compactor lug to a compactor roller by screws or bolts to enable removement thereof. However, this has been unsuccessful because the large forces exerted on the lug members tend to loosen such connection between such lugs and the compactor drum. Therefore conventional "sheep foot" or lug compactors have the lugs permanently attached to the compactor drum by welding or the like. As a result, when the compactor lugs become worn or broken either such lugs must be cut off of the compactor drum by means of a blowtorch and replaced by welding which are both very time-consuming processes, or the entire compactor drum is thrown away and replaced. Both of the above procedures are extremely costly and are avoided by employing the improved compactor lug of the present invention.

The compactor lug of the present invention has the additional advantage that the replaceable cap member is held securely in place by a "dovetail joint," which is herein defined as including any interlocking joint formed by overlapping undercut members. The dovetail joint is tapered to prevent movement of the cap member in all but one direction and a locking pin is provided to prevent the removal of such cap member in such one direction unless such pin is first driven out of the lug. The dovetail joint extends in the direction of rotation of the compactor roller which prevents the lug cap connection from loosening during rotation and actually causes self-tightening because of the taper in such joint. This provides an extremely strong connection but also enables the cap member to be quickly and easily removed.

Furthermore, by employing a cap member separate from the body member of the lug, such cap member may be made of a harder material than the body of the lug so that harder and more expensive steels or other materials may be employed for the lug cap than for the body of the lug, which is not economically feasible with a lug of one piece construction. Previously compactor lugs have been surface treated by welding or the like to provide them with a hard face on their ground-engaging surface but this has proved unsatisfactory because the hardened layer is very thin and soon wears away. The much thicker cap member of the lug of the present invention lasts for a considerably longer time than the hardened surface of prior lugs.

It is therefore one object of the present invention to provide an improved earth compactor apparatus having compactor lugs with separate, removable cap members.

Another object of the present invention is to provide an improved compactor lug having a removable cap member which is securely fastened to the lug by a dovetail joint extending in the direction of rotation of the compactor but can be easily and quickly removed when such cap member becomes worn or damaged.

A further object of the invention is to provide an improved compactor roller having a plurality of spaced ground-engaging lugs having removable cap portions to enable such compactor roller to be repaired quickly and inexpensively by replacement of such cap members when they become worn.

An additional object of the present invention is to provide an improved compactor lug having a removable cap portion separate from the body of such lug to enable such cap portion to be made of a harder material than the remainder of the lug without greatly increasing the cost of such lug.

Still another object of the present invention is to provide an improved compactor lug having a removable cap portion tightly secured to the body portion of the lug by a flat, tapered dovetail joint and a pin to enable quick and easy removal of such cap member without the use of special tools.

Other objects and advantages of the present invention will be apparent from the following detailed description of a preferred embodiment thereof and from the attached drawings of which:

Figure 1:
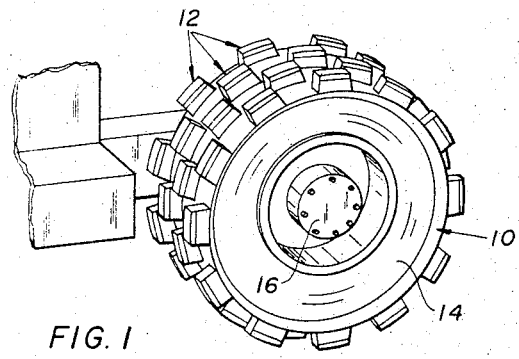
FIG. 1 is an oblique view of a compactor roller made in accordance with the present invention.
Figure 5:
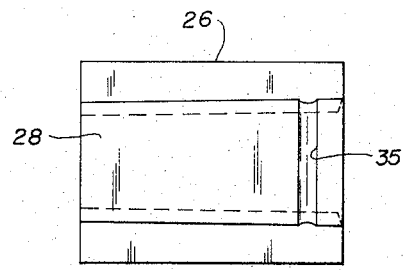
FIG. 5 is an oblique view of the replaceable lug cap of the present invention.
Figure 3:
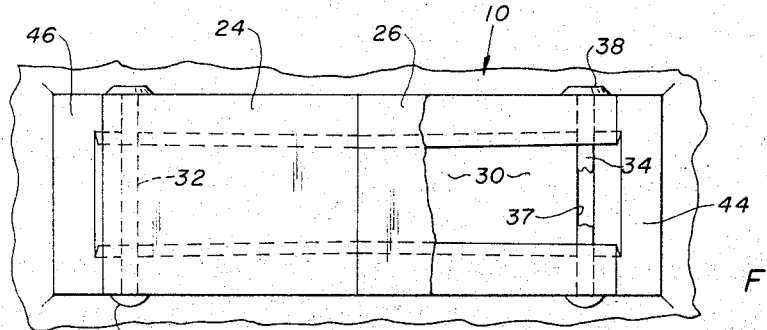
FIG. 3 is a plan view of the top of the lug of FIG. 2 with a portion of the cap member broken away for purposes of clarity.

As shown in FIG. 1, a compactor roller of the present invention includes a cylindrical support drum 10 of steel or other suitable metal having a plurality of compactor lugs 12 permanently secured to the outer surface of such drum by welding or the like in a plurality of annular rows of staggered lugs. While the compactor drum may be an attachment which is pulled by a tractor or other vehicle, it may also be employed directly on the wheels of such vehicle. Thus, the inflated rubber tires 14 attached to the front or rear axle 16 of a truck may be covered by a hollow compactor drum 10. This may be accomplished by inserting the compactor drum over the tires before they are fully inflated and subsequently inflating the tires to insure a tight fit.

Figure 2:
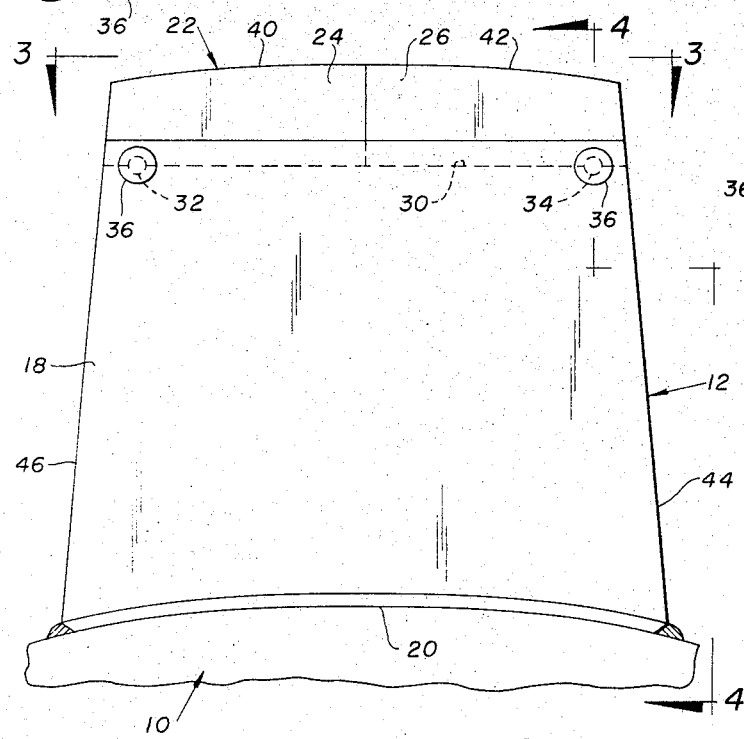
FIG. 2 is a side view of one of the compactor lugs used on the roller of FIG. 1, drawn on a larger scale.

As shown in FIG. 2, the compactor lug 12 of the present invention may have a tapered shape including a truncated wedge shaped body member 18 having an arcuate base surface 20 at the bottom thereof which is secured to the outer surface of the compactor drum by welding. The body member 18 is molded of a steel alloy having a nickel-manganese base with a Rockwell "C" hardness of approximtaely 25. The compactor lug is provided with a removable cap member 22 which may be formed of two similar cap segments 24 and 26 which are attached to the top or outer surface of the body member 18 by tapered flat dovetail joints. Each of these dovetail joints extends in the direction of rotation of the compactor drum and is formed by a dovetailed tongue portion 28 provided on the bottom of each of the cap segments 24 and 26 and a dovetail groove 30 provided on the top of the lug body member 18. In one example the dovetail tongue and groove taper from a maximum width of 2½ inches at outer end adjacent the opposite sides of the lug to a minimum width of 2¼ inches at the inner end of such segments which engage one another at approximately the middle of such body member. It should be noted that the above dimensions were for the peak of the dovetail tongue 28 and the bottom of the dovetail groove 30, while the dimensions at the base of the tongue and the top of such groove are 2 inches maximum width and 1¾ inches minimum width. The length of the entire cap member 22 including both segments 24 and 26 is 10 inches while the width of such member is 4 inches, so that each of the dovetail joints tapers ¼-inch over the 5 inch length of each cap segment in the example given.

The lug cap member 22 is molded from a different stainless steel alloy than the base member 18 and may be an iron base alloy having a Rockwell "C" hardness of 54, so that it is considerably harder than the material of such base member. The primary reason for making the cap member 22 of two separate segments 24 and 26 is that it is difficult to mold a single segment in one piece 10 inches long from the particular steel alloy employed. However, with lugs of reduced length or those made from a different material for the cap member it is possible to form the cap member in a single piece, in which case a single tapered flat dovetail joint would be employed to attach such cap member to the body member.

Figure 4:
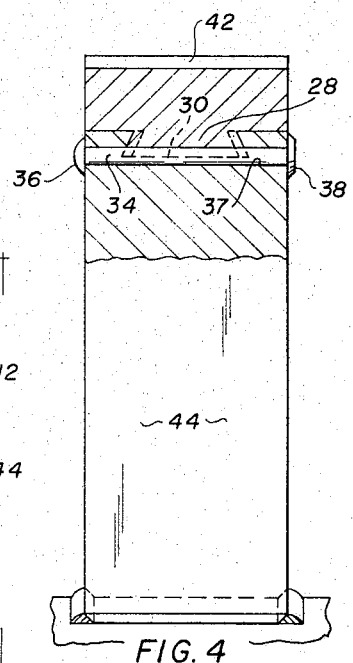
FIG. 4 is a vertical section view taken along the line 4—4 of FIG. 2.

A pair of stop pins 32 and 34 of soft metal alloy about 17/32-inch in diameter are provided through holes extending through the cap segments 24 and 26 and the lug base member 18 adjacent the opposite ends of the lug in position so that such pins pass through grooves 35 across the tongue members 28 and the grooves 37 across the dovetail groove 30. These pins prevent the cap segments from moving longitudinally out of the dovetail grooves 30 in the opposite direction from which they were inserted into such grooves. Of course the dovetail joints prevent any movement of such cap segments with respect to the lug body member in all other directions. Thus the pins and dovetail joints securely fasten the cap segments to the lug body. Each of the pins 32 is provided with an enlarged head portion 36 at one end thereof, as shown in FIG. 4, while the other end of such pin is peened over to provide another enlarged portion 38, which prevent the pins from being removed from the holes in the lug accidentally. However, when it is desired to remove a broken or worn cap segment, it is merely necessary to position a punch member of slightly smaller diameter than the pin onto the peened portion 38 and strike such punch member with a hammer or other object to drive the pin out of the lug. This enables the cap segments to be pried out of the dovetail groove 30 by inserting a screw driver or other wedge member between the adjacent ends of segments 24 and 26 and push such wedge member against the secured cap segment.

In the example of the compactor lug shown, the outer ground-engaging surfaces 40 and 42 of cap segments 24 and 26, respectively, join to form a continuous arcuate surface having a radius of curvature of approximately 40 inches and a length of approximately 10 inches. As stated previously the base surface 32 of the lug has a radius of curvature of either 31 or 33 inches, depending on the size of the compactor drum. The base 20 of the lug is about 12 inches long and this means that the trapezoidal sides of the lug taper 2 inches from the base 20 to the top surface 40–42 of such lug over a distance of 8 inches, which is the height of the lug. The opposite ends 44 and 46 of the lug have a rectangular shape 4 inches wide by 8 inches high. The uniform thickness of the lug enables more lugs to be secured to a given compactor drum surface, while the tapered length enables the lug to be removed from the ground without pulling up dirt.

It should be noted that many different shapes can be employed for the compactor lug in addition to that shown. For example, the lug could be in the form of the frustum of a pyramid having tapered side and end surfaces or it could be of a frusto-conical shape. Furthermore it would be possible to make the cap member out of a single piece in which case only a single dovetail joint and locking pin would be necessary.

It will be obvious to those having ordinary skill in the art that many changes may be made in the details of the above described preferred embodiments of the present invention without departing from the spirit of the invention. Therefore, the scope of the present invention should only be determined by the following claims.

I claim:
1. A compactor roller comprising:
an annular drum having a plurality of spaced lugs extending radially outward from the outer surface of said drum;
a plurality of separate lug caps; and
mechanical connection means including a dovetail joint for removably attaching said lug caps to said lugs to enable replacement of said lug caps when they become worn or damaged said dovetail joint extending in the direction of rotation of said drum and being tapered in said direction.
2. A compactor roller comprising:
an annular drum having a plurality of spaced lugs extending radially outward from the outer surface of said drum;
a plurality of separate lug caps of harder material than said lugs; and
mechanical connection means including a tapered dovetail joint extending in the direction of rotation of said drum and a pin associated with each lug cap, for removably attaching a pair of said lug caps to each of said lugs to enable replacement of said lug caps when they become worn or damaged, said pair of caps having their dovetail joints tapering in opposite directions.
3. A lug for a compactor roller, comprising:
a lug body member having a top portion and a base portion spaced from one another; and
a lug cap removably attached to said top portion of said body member by a flat dovetail joint extending in the direction of rotation of said roller and tapering in said direction to prevent movement of said cap with respect to said body member.
4. A lug for a compactor roller, comprising:
a lug body member having a top portion and a base portion spaced from one another, said base portion being adapted to be permanently secured to said roller;
a lug cap removably attached to said top portion of said body member by a tapered dovetail joint extending in the direction of rotation of said roller to prevent movement of said cap with respect to said body member; and
a pin extending through holes in said body member and said cap to prevent longitudinal movement of said cap with respect to said body member.
5. A lug for a compactor roller, comprising:
a lug body member having a top portion and a base portion spaced from one another, said base portion being adapted to be permanently secured to said roller;
lug cap means including two cap segments removably attached to said top portion of said body member by two tapered dovetail joints extending in the direction of rotation of said roller to prevent movement of said cap segments with respect to said body mem- ber, said two dovetail joints being tapered in opposite directions; and a pair of pins extending through holes in said body member and said cap segments to prevent longitudinal movement of said cap segments with respect to said body member.

6. A removable cap for a lug on a compactor roller, comprising:

a cap member of strong abrasive resistance material; and dovetail joint means on the inner surface of said cap member for removable attachment of said cap member to said lug, said dovetail joint extending in the direction of rotation of said roller and being tapered in said directon.

7. A removable cap for a lug on a compactor roller, comprising:

a cap member of strong abrasive resistance material having an arcuate outer surface;

tapered dovetail joint means on the inner surface of said cap member for removable attachment of said cap member to said lug, said dovetail joint extending in the direction of rotation of said roller; and said cap member having a notch in its inner surface extending in a direction lateral to said dovetail joint portion to enable a pin to be inserted into said notch to lock sad cap member against longitudinal movement with respect to said lug.

8. A removable cap for a lug on a compactor roller, comprising:

a cap member of strong abrasive resistance material harder than the material of said lug, having an arcuate outer surface;

tapered flat dovetail joint means on the inner surface of said cap member for removable attachment to said lug, said dovetail joint extending in the direction of rotation of said roller;

said dovetail means being tapered longitudinally along said inner surface, and said cap member having a notch in its inner surface extending across said dovetail joint portion to enable a pin to be inserted into said notch to lock said cap member against longitudinal movement with respect to sad lug.

References Cited

UNITED STATES PATENTS

| | | | |
|---|---|---|---|
| 1,371,303 | 3/1921 | Emerson | 94—50 |
| 2,226,182 | 12/1940 | Ross | 94—50 |
| 2,304,424 | 12/1942 | Schoniwitz | 301—44 |
| 2,893,298 | 7/1959 | Averette | 94—50 |
| 3,252,391 | 5/1966 | Dils | 94—50 |
| 3,274,908 | 9/1966 | Grant et al. | 94—50 |

FOREIGN PATENTS 15,846  9/1928  Australia.

JACOB L. NACKENOFF, *Primary Examiner.*